United States Patent
Matsuda (10) Patent No.: US 8,267,136 B2
(45) Date of Patent: Sep. 18, 2012

(54) HEAVY-DUTY PNEUMATIC TIRE

(75) Inventor: Jun Matsuda, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 496 days.

(21) Appl. No.: 12/307,880

(22) PCT Filed: Jul. 17, 2007

(86) PCT No.: PCT/JP2007/064085
§ 371 (c)(1),
(2), (4) Date: Jan. 7, 2009

(87) PCT Pub. No.: WO2008/013075
PCT Pub. Date: Jan. 31, 2008

(65) Prior Publication Data
US 2009/0205766 A1    Aug. 20, 2009

(30) Foreign Application Priority Data
Jul. 25, 2006  (JP) .................................. 2006-201922

(51) Int. Cl.
*B60C 15/00* (2006.01)
*B60C 5/14* (2006.01)

(52) U.S. Cl. ........ 152/539; 152/511; 152/512; 152/544; 152/546; 152/552

(58) Field of Classification Search .................. 152/450, 152/510, 511, 512, 539, 543, 544, 546, 547, 152/552, 379.4, 379.5, 381.4, DIG. 60
See application file for complete search history.

(56) References Cited

U.S. PATENT DOCUMENTS

| 4,508,153 | A | * | 4/1985 | Tanaka et al. ................. 152/543 |
| 4,878,527 | A | * | 11/1989 | Noma ........................ 152/379.3 |
| 4,917,164 | A | * | 4/1990 | Ushikubo et al. ............. 152/517 |
| 4,941,523 | A | * | 7/1990 | Galante et al. ................ 152/543 |
| 5,065,803 | A | * | 11/1991 | Nakatani et al. .............. 152/543 |

(Continued)

FOREIGN PATENT DOCUMENTS
JP         A 7-502471        3/1995

(Continued)

*Primary Examiner* — Joseph Del Sole
*Assistant Examiner* — Seyed Masoud Malekzadeh
(74) *Attorney, Agent, or Firm* — Greer, Burns & Crain, Ltd.

(57) ABSTRACT

An object of the present invention is to provide a heavy-duty pneumatic tire that is capable of suppressing deterioration by oxidation at a portion of a high heat generation in a bead portion, and that is excellent in sustainability of inner pressure holding performance as well as in durability. The heavy-duty pneumatic tire of the present invention includes a carcass and an inner liner disposed closer to the center of the tire than the carcass. The heavy-duty pneumatic tire is characterized in that one of a thermoplastic resin and a thermoplastic elastomer composition containing a blend of a thermoplastic resin with an elastomer is disposed at a position closer to the center than the carcass in the bead portion in such a manner as to wrap at least a region extending to a front end $P_B$ of a bead toe or a region extending further from the front end $P_B$ of the bead toe to a portion beneath the bead, and the one of the thermoplastic resin and the thermoplastic elastomer composition containing the blend of the thermoplastic resin with the elastomer overlaps the inner liner by at least 2 mm in a tire width direction.

8 Claims, 4 Drawing Sheets

U.S. PATENT DOCUMENTS

| | | | |
|---|---|---|---|
| 5,279,347 A * | 1/1994 | Stephens et al. | 152/379.5 |
| 5,499,670 A | 3/1996 | Billieres | |
| 5,511,599 A * | 4/1996 | Willard, Jr. | 152/454 |
| 5,868,190 A * | 2/1999 | Willard et al. | 152/517 |
| 5,938,869 A * | 8/1999 | Kaido et al. | 152/510 |
| 5,979,527 A * | 11/1999 | Kobayashi et al. | 152/525 |
| 6,116,313 A * | 9/2000 | Costa Pereira et al. | 152/547 |
| 6,840,297 B2 * | 1/2005 | Farinola | 152/539 |
| 2003/0062105 A1 * | 4/2003 | Kanenari et al. | 152/517 |
| 2006/0182976 A1 | 8/2006 | Yamakawa et al. | |

FOREIGN PATENT DOCUMENTS

| | | |
|---|---|---|
| JP | A 2000-177307 | 6/2000 |
| JP | A 2001-23013 | 1/2001 |
| JP | A 2004-168244 | 6/2004 |
| JP | A 2005-343380 | 3/2005 |
| WO | WO 2005/063482 A1 | 7/2005 |
| WO | WO 2006/100872 A1 | 9/2006 |

* cited by examiner

HEAVY-DUTY PNEUMATIC TIRE

This application is a U.S. National Phase under 35 U.S.C. §371 of International Application No. PCT/JP2007/064085, filed Jul. 17, 2007.

TECHNICAL FIELD

The present invention relates to a heavy-duty pneumatic tire.

More specifically, the present invention relates to a heavy-duty pneumatic tire having an excellent resistance to deterioration by oxidation particularly of a bead portion.

BACKGROUND ART

In a conventional heavy-duty pneumatic tire, bead portions (near rim flanges) are enormously deformed in many occasions. Accordingly, for the purpose of protecting a carcass at each of the bead portions, a cord reinforcing layer using steel cords is disposed to suppress the deformation of the bead portion.

However, the disposing of the cord reinforcing layer for suppressing the deformation increases a shear stress at the bead portions. As a result, heat generation at the bead portions during the running of the tire becomes higher than those at the other portions of the tire, thus bringing about a phenomenon in which rubber is deteriorated by the heat generation.

This deterioration in turn causes a phenomenon in which oxygen in the air filled in the tire permeates into tire rubbers. The permeation of oxygen in the air filled in the tire accelerates, at the bead portions, the deterioration due to the oxidation deterioration of rubber, as compared with the other portions (side portions and the like) of the tire. As a result, a failure, such as occurrence of separation due to reduction in break elongation, is more likely to occur. Moreover, a brake heat is conducted to the bead portions via the rim, thus further accelerating the deterioration of the peripheral portions of the bead portions.

Such deterioration of the bead portions due to oxidation deterioration can be observed as change with time in tire performances, such as the inner pressure holding performance and durability performance of the tire. In particular, in the field of heavy-duty pneumatic tires, tires capable of suppressing such oxidation deterioration have been desired.

In a general pneumatic tire, an inner liner made of rubber excellent in air impermeability is disposed in a surface, on the inner cavity side, of the tire. In this respect, proposed is a tire structure in which an inner liner made of a rubber material, such as a butyl rubber, excellent in the air impermeability is disposed in such a manner as to wrap around a bead toe portion then extending therearound to the outer side, in the axial direction, of the tire (Patent Document 1).

However, in the case of the proposed structure, since the adhesion of a butyl rubber and a diene rubber is normally weak, the bead toe portion is sometimes chipped off when the tire is fitted onto or removed from a rim. By contrast, if a lower end portion of the inner liner is extended only to a position slightly above a distal end of the toe, there is the following disadvantage. Specifically, in this case, a small region of the inner surface side of the tire is not covered by the inner liner. Oxygen and moisture in the air gradually permeate through this region, since the heavy-duty tire has a high inner pressure for use. Eventually, a minute crack occurs in an end of a steel reinforcing cord due to rust or a reduction in adhesion. Such a minute crack grows and thus leads to chafer separation or separation at a carcass turn-up edge.

Patent Document 1: Japanese patent application Kokai publication No. 2001-23013

DISCLOSURE OF INVENTION

Problem to be Solved by Invention

An object of the present invention is to provide, in view of the above-described points, a heavy-duty pneumatic tire that is capable of suppressing deterioration by oxidation at a portion of a high heat generation in a bead portion, and that is excellent in sustainability of inner pressure holding performance as well as in durability.

Means for Solving the Problem

The heavy-duty pneumatic tire according to the present invention for achieving the above-described object has a structure of the following (1).

(1) A pneumatic tire including: a carcass; and an inner liner disposed closer to the center of the tire than the carcass, the heavy-duty pneumatic tire characterized in that one of a thermoplastic resin and a thermoplastic elastomer composition comprising a blend of a thermoplastic resin with an elastomer is disposed at a position closer to the center than the carcass in a bead portion in such a manner as to wrap at least a region extending to a front end $P_B$ of a bead toe or a region extending further from the front end $P_B$ of the bead toe to a portion beneath a bead, and the one of the thermoplastic resin and the thermoplastic elastomer composition comprising the blend of the thermoplastic resin with the elastomer overlaps the inner liner by at least 2 mm in a tire width direction.

Moreover, the heavy-duty pneumatic tire according to the present invention is more specifically preferably a pneumatic tire having a structure of any one of the following (2) to (6).

(2) The heavy-duty pneumatic tire described in the above (1), characterized in that a region where a lower end side edge of the one of the thermoplastic resin and the thermoplastic elastomer composition comprising the blend of the thermoplastic resin with the elastomer exists is set within a region, beneath the bead, extended from the front end $P_B$ of the bead toe to a position away from an end, on the bead toe side, of the bead core by a distance of not more than 20% of a width $W_B$ of the bead core.

(3) The heavy-duty pneumatic tire described in any one of the above (1) and (2), characterized in that an upper end side edge of the one of the thermoplastic resin and the thermoplastic elastomer composition comprising the blend of the thermoplastic resin with the elastomer is located at a position closer to the center of the tire than a lower end side edge of the inner liner.

(4) The heavy-duty pneumatic tire described in any one of the above (1) and (2), characterized in that an upper end side edge of the one of the thermoplastic resin and the thermoplastic elastomer composition comprising the blend of the thermoplastic resin with the elastomer is located at a position farther from the center of the tire than a lower end side edge of the inner liner.

(5) The heavy-duty pneumatic tire described in (3), characterized in that an adhesion reinforcing rubber layer is disposed between layers respectively of the carcass and the one of the thermoplastic resin and the thermoplastic elastomer composition comprising the blend of the thermoplastic resin with the elastomer.

(6) The heavy-duty pneumatic tire described in any one of (1) to (5), characterized in that the one of the thermoplastic resin and the thermoplastic elastomer composition comprising the blend of the thermoplastic resin with the elastomer has an air permeability coefficient of $1\times10^{-12}$ to $40\times10^{-12}$ cc·cm/cm²·sec·cmHg, and a thickness of 0.2 mm to 2.0 mm.

Effect of Invention

According to the present invention, provided is a heavy-duty pneumatic tire that is capable of suppressing deterioration by oxidation at a portion of a high heat generation in a bead portion, and that is excellent in sustainability of inner pressure holding performance as well as in durability.

EXPLANATION OF REFERENCE NUMERALS

1 HEAVY-DUTY PNEUMATIC TIRE
2 TREAD PORTION
3 CARCASS
4 BEAD CORE
5 CORD REINFORCING LAYER(STEEL CORD REINFORCING LAYER
6 INNER LINER
7 BEAD FILLER
8 MEMBER OF THERMOPLASTIC RESIN OR THERMOPLASTIC ELASTOMER COMPOSITION CONTAINING BLEND OF THERMOPLASTIC RESIN WITH ELASTOMER
B Bead Portion
$P_B$ FRONT END OF BEAD TOE
$W_B$ WIDTH OF BEAD CORE
L LENGTH BY WHICH INNER LINER 6 IS OVERLAPPED, IN TIRE WIDTH DIRECTION, WITH MEMBER 8 OF THERMOPLASTIC RESIN OR THERMOPLASTIC ELASTOMER COMPOSITION CONTAINING BLEND OF THERMOPLASTIC RESIN WITH ELASTOMER
Z REGION EXTENDED FROM POSITION OF FRONT END $P_B$ OF BEAD TOE TO DEAD END POSITION AWAY FROM BEAD CORE END BY DISTANCE OBTAINED BY MULTIPLYING WIDTH $W_B$ OF BEAD CORE BY 0.2

BEST MODE FOR CARRYING OUT THE INVENTION

Hereinafter, a heavy-duty pneumatic tire according to the present invention will be described in more detail.

The heavy-duty pneumatic tire according to the present invention is a heavy-duty pneumatic tire that includes a carcass and an inner liner disposed closer to the center of the tire than the carcass and that is characterized by having the following structure. In the heavy-duty pneumatic tire, a member of a thermoplastic resin or a thermoplastic elastomer composition containing a blend of the thermoplastic resin with an elastomer is disposed at a position closer to the center than the carcass in the bead portion in such a manner as to wrap at least a region extending to a front end $P_B$ of a bead toe or a region extending further from the front end $P_B$ of the bead toe to a portion beneath the bead. In addition, the member of the thermoplastic resin or the thermoplastic elastomer composition containing the blend of the thermoplastic resin with the elastomer overlaps the inner liner by a length of at least 2 mm in a tire width direction.

Figure 1:
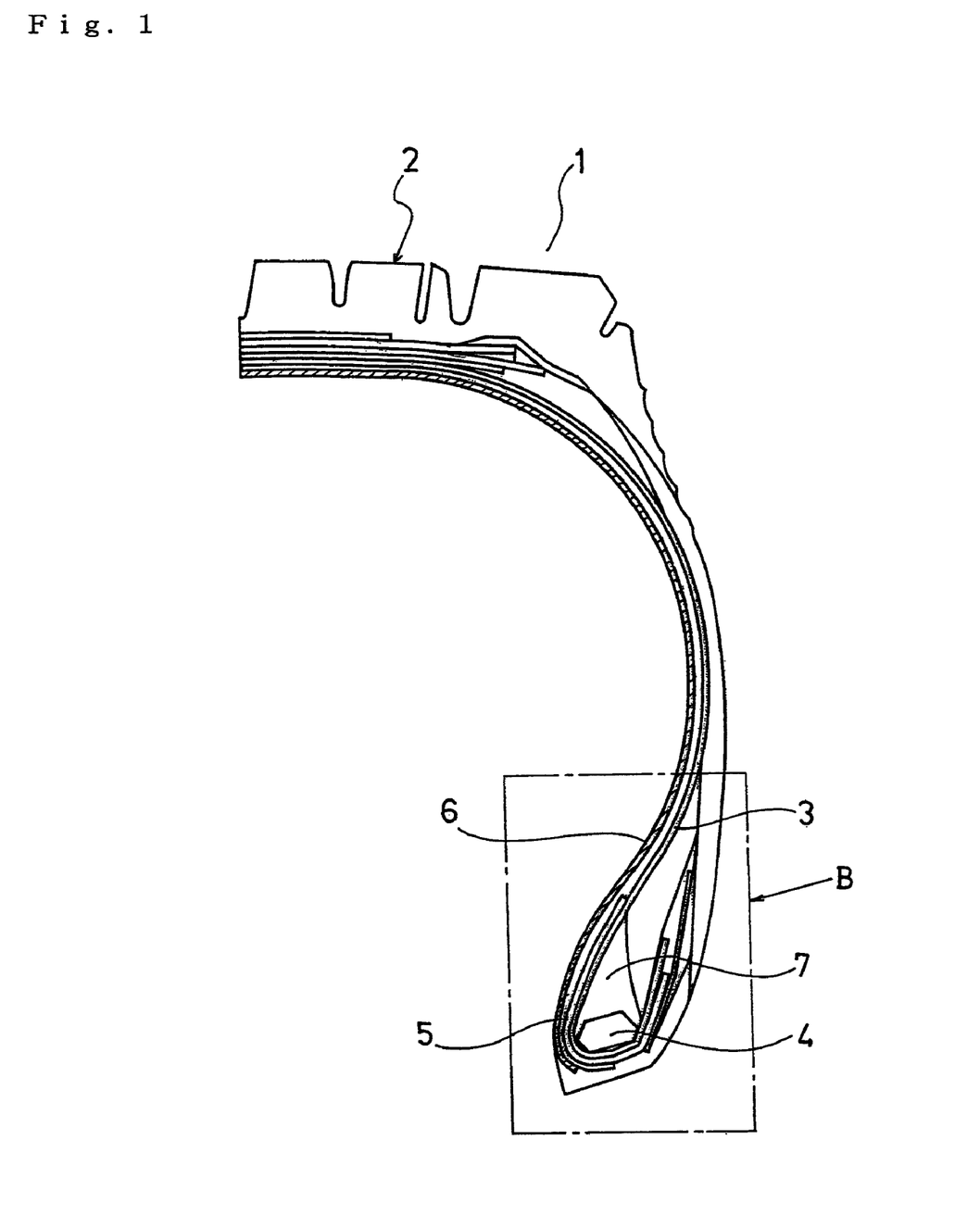
FIG. 1 is a schematic model view of a cross-section, taken in a meridian direction, of a tire bead portion, and shows a structure of a conventionally-available general heavy-duty pneumatic tire.

The structure will be described by referring to FIG. 1 and FIG. 2. FIG. 1 is a schematic model view of a cross section, taken in a meridian direction, of a conventionally-available general heavy-duty pneumatic tire, and shows the structure of the tire. In a bead portion B of the heavy-duty pneumatic tire 1, a carcass 3 is wound up from the inside to the outside of the tire in such a manner as to wrap a bead core 4 and a bead filler 7. Reference numeral 2 denotes a tread portion of the tire, 5 denotes a cord reinforcing layer using steel cords or the like, and 6 denotes an inner liner.

Figure 2:
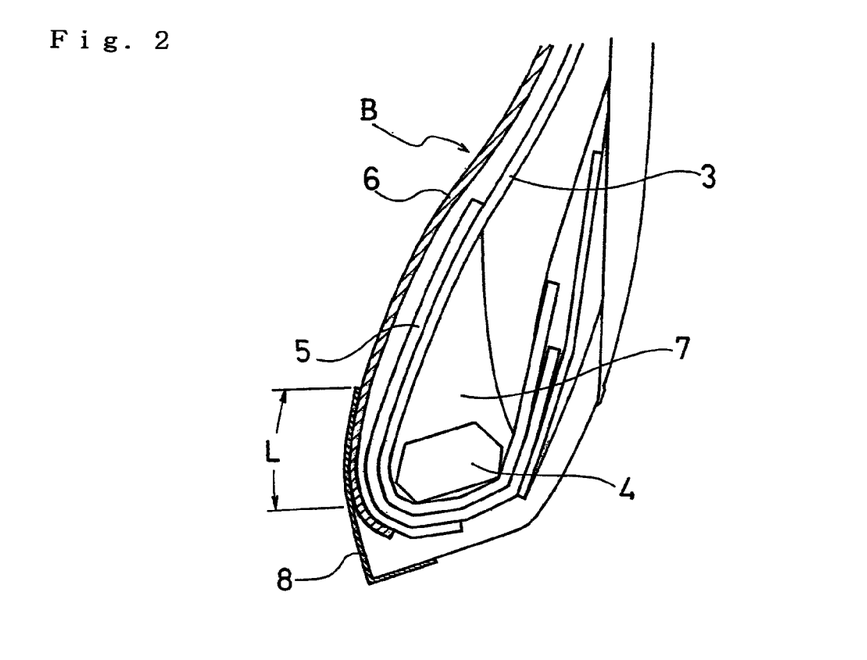
FIG. 2 is a schematic model view of a cross-section, taken in a meridian direction, of a tire bead portion, and shows a structure of an embodiment of a heavy-duty pneumatic tire according to the present invention.

The heavy-duty pneumatic tire 1 according to the present invention has the following structure as shown in FIG. 2. A member 8 of a thermoplastic resin or a thermoplastic elastomer composition containing a blend of the thermoplastic resin with an elastomer is disposed at a position closer to the center than the carcass 3 in the bead portion B in such a manner as to wrap at least a region extending to the front end $P_B$ of the bead toe or a region extending further from the front end $P_B$ of the bead toe to the portion beneath the bead. In addition, the member 8 of the thermoplastic resin of the thermoplastic elastomer composition containing the blend of the thermoplastic resin with the elastomer overlaps the inner liner 6 by a length of at least 2 mm in the tire width direction.

Figure 3:
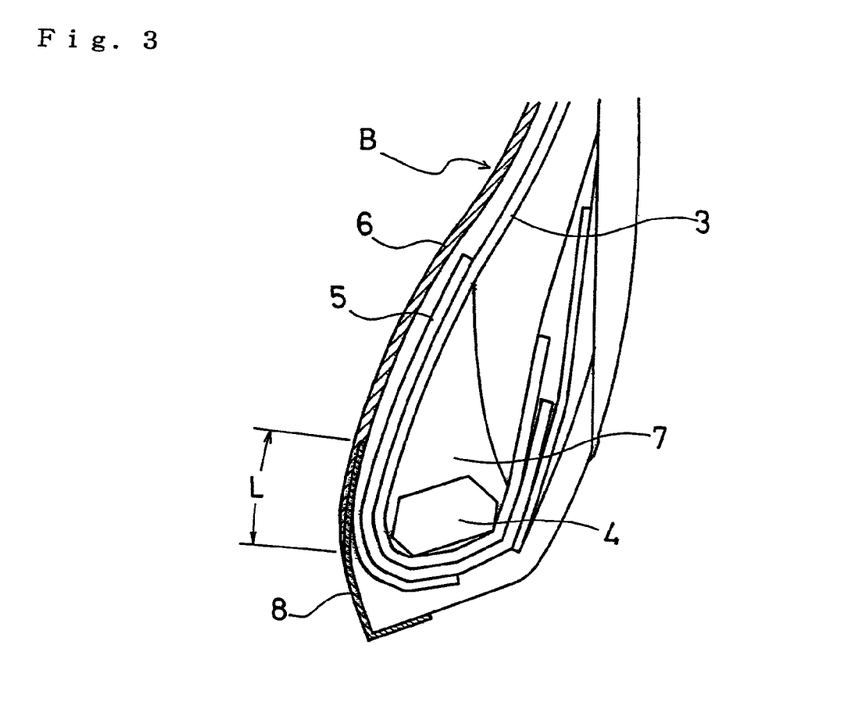
FIG. 3 is a schematic model view of a cross-section, taken in a meridian direction, of a tire bead portion, and shows a structure of another embodiment of the heavy-duty pneumatic tire according to the present invention.

Here, the overlapping length by which the member 8 of the thermoplastic resin of the thermoplastic elastomer composition containing the blend of the thermoplastic resin with the elastomer overlaps the inner liner 6 in the tire width direction is a length L of a portion where the member 8 and the inner liner 6 are bonded to each other as shown in FIG. 2 and FIG. 3. In other words, this overlapping length is the length of a portion where a lower end side edge of the inner liner 6 actually overlaps an upper end side edge of the member 8 of the thermoplastic resin of the thermoplastic elastomer composition containing the blend of the thermoplastic resin with the elastomer.

A preferable upper limit of the overlapping length L is 30 mm according to the knowledge of the present inventors, and a preferable range of the overlapping length is from 15 mm to 25 mm. Note that these members are bonded to each other preferably by using an adhesive agent, which may be any one capable of the bonding and is not limited to a specific adhesive agent.

As described above, the portion is provided where the member 8 of the thermoplastic resin of the thermoplastic elastomer composition containing the blend of the thermoplastic resin with the elastomer overlaps the inner liner 6, and these members are bonded to each other. In addition, the member 8 of the thermoplastic resin of the thermoplastic elastomer composition containing the blend of the thermoplastic resin with the elastomer is disposed in such a manner as to wrap at least the region extending to the front end $P_B$ of the bead toe or the region extending further from the front end $P_B$ of the bead toe to the portion beneath the bead. Forming the structure of the inner surface side of the bead portions in this manner makes it possible to efficiently suppress deterioration by oxidation in portions of a high heat generation without leading to an excessive increase in weight of the tire or without leading to deterioration in rolling resistance of the tire.

In the heavy-duty pneumatic tire according to the present invention, it is preferable that a region where the lower end side edge of the member 8 of the thermoplastic resin of the thermoplastic elastomer composition containing the blend of the thermoplastic resin with the elastomer exists be set within a region, beneath the bead, extended from the front end $P_B$ of the bead toe to a position away from an end, on the bead toe side, of the bead core by a distance of not more than 20% of a width $W_B$ of the bead core. Here, the width $W_B$ of the bead core referred to in the present invention will be described with reference to FIG. 6. Reference Symbol Bi denotes a tire's innermost surface point that is defined as a point, closest to the center of the tire in the tire axial direction, on the surface of the bead core, while Bo denotes a tire's outermost surface point that is defined as a point, farthest from the center of the tire in the tire axial direction, on the surface of the bead core. Vertical lines are drawn down in the tire radial direction respectively from these two points Bi and Bo. Intersections at which the respective vertical lines intersect a line parallel to the tire axial direction are denoted by Reference Symbols Ci and Co. The distance between these intersections Ci and Co is defined as the width $W_B$ of the bead core. In other words, the lower end side edge of the member 8 is preferably located within a region Z extended from the front end $P_B$ of the bead toe to a dead end position away from the bead core end by a distance obtained by multiplying the width $W_B$ of the bead core by 0.2. It is preferable that the member 8 of the thermoplastic resin of the thermoplastic elastomer composition containing the blend of the thermoplastic resin with the elastomer be disposed, as described above, in such a manner as to extend to the front end $P_B$ of the bead toe or to wrap over the front end $P_B$. This structure prevents a problem that the bead toe portion is chipped off, for example, when the tire is fitted onto or removed from the rim. It is not preferable that the member 8 of the thermoplastic resin of the thermoplastic elastomer composition containing the blend of the thermoplastic resin with the elastomer be disposed so that the lower end thereof exists beyond the region Z to reach a position on the tire's outer surface side. This is because, in this case, the lower end of the member 8 of the thermoplastic resin of the thermoplastic elastomer composition containing the blend of the thermoplastic resin with the elastomer is more likely to be separated. Once occurring, such separation may extend to the tire's inner surface side, possibly leading to a case where the member 8 and the inner liner portion bonded to each other at the overlapping portion are separated from each other.

In the heavy-duty pneumatic tire according to the present invention, the upper end side edge of the member 8 of the thermoplastic resin of the thermoplastic elastomer composition containing the blend of the thermoplastic resin with the elastomer is only necessary to be overlapped with the inner liner 6. Any of the member 8 and the inner liner 6 may be on the innermost surface side.

For example, FIG. 2 shows a structural example in which the upper end side edge of the member 8 of the thermoplastic resin of the thermoplastic elastomer composition containing the blend of the thermoplastic resin with the elastomer is located at a position closer to the center of the tire than the lower end side edge of the inner liner 6.

On the other hand, FIG. 3 shows a structural example in which the upper end side edge of the member 8 of the thermoplastic resin of the thermoplastic elastomer composition containing the blend of the thermoplastic resin with the elastomer is located at a position farther from the center of the tire than the lower end side edge of the inner liner 6. The heavy-duty pneumatic tire according to the present invention may employ any of the structures shown in FIGS. 2 and 3.

It is also preferable that an adhesion reinforcing rubber layer be disposed between the layers of the carcass 3 and the member 8 of the thermoplastic resin or the thermoplastic elastomer composition containing the blend of the thermoplastic resin with the elastomer.

The member 8 of the thermoplastic resin of the thermoplastic elastomer composition containing the blend of the thermoplastic resin with the elastomer to be used for the heavy-duty pneumatic tire according to the present invention preferably has an air permeability coefficient of $1 \times 10^{-12}$ to $40 \times 10^{-12}$ cc·cm/cm²·sec·cmHg, and a thickness of 0.2 mm to 2.0 mm.

If the air permeability coefficient of the member 8 is larger than $40 \times 10^{-12}$ cc·cm/cm²·sec·cmHg, a greater thickness is required for favorably obtaining the effects of the present invention achieved by preventing oxygen permeation. Accordingly, such an air permeability coefficient is not preferable. By contrast, consider the case where the air permeability coefficient is smaller than $1 \times 10^{-12}$ cc·cm/cm²·sec·cmHg. In general, the blending proportion of the thermoplastic resin is increased for obtaining such an air permeability coefficient; in this case, however, the flexibility of the materials is deteriorated, and thus the resistance to flex fatigue is reduced. Accordingly, such an air permeability coefficient is not preferable in terms of durability.

Examples of thermoplastic resins that satisfy the above-described air permeability coefficient value and are usable for the present invention include: polyamide resins (for example, Nylon 6 (N6), Nylon 66 (N66), Nylon 46 (N46), Nylon 11 (N11), Nylon 12 (N12), Nylon 610 (N610), Nylon 612 (N612), Nylon 6/66 copolymers (N6/66), Nylon 6/66/610 copolymers (N6/66/610), Nylon MXD6, Nylon 6T, Nylon 6/6T copolymers, Nylon 66/PP copolymers, and Nylon 66/PPS copolymers); their N-alkoxyalkylated products (for example, methoxymethylated 6-nylon, methoxymethylated 6-610-nylon, and methoxymethylated 612-nylon); polyester resins (for example, aromatic polyesters, such as polybutylene terephthalate (PBT), polyethylene terephthalate (PET), polyethylene isophthalate (PEI), PET/PEI copolymers, polyarylate (PAR), polybutylene naphthalate (PBN), liquid crystal polyester, and polyoxyalkylene diimide diacid/polybutylene terephthalate copolymers); polynitrile resins (for example, polyacrylonitrile (PAN), polymethacrylonitrile, acrylonitrile/styrene copolymers (AS), methacrylonitrile/styrene copolymers, methacrylonitrile/styrene/butadiene copolymers); polymethacrylate resins (for example, polymethyl methacrylate (PMMA), polyethyl methacrylate); polyvinyl resins (for example, vinyl acetate (EVA), polyvinyl alcohol (PVA), vinyl alcohol/ethylene copolymers (EVOH), polyvinylidene chloride (PVDC), polyvinyl chloride (PVC), vinyl chloride/vinylidene chloride copolymers, vinylidene chloride/methyl acrylate copolymers, vinylidene chloride/acrylonitrile copolymers); cellulose resins (for example, cellulose acetate, cellulose acetate butyrate); fluororesins (for example, polyvinylidene fluoride (PVDF), polyvinyl fluoride (PVF), polychlorotrifluoroethylene (PCTFE), ethylene tetrafluoroethylene copolymers (ETFE)); and imide resins (for example, aromatic polyimide (PI)). A combination of two or more of these resins may also be used.

Alternatively, it is also possible to use a thermoplastic elastomer composition containing a blend of any of the above-described thermoplastic resins with an elastomer. The elastomer component that can be blended with the thermoplastic resins may be any one that forms a composition when being blended with the thermoplastic resins, so that the resultant composition consequently has an air permeability coefficient as described above. The type and amount of the elastomer component are not particularly limited.

Examples of such usable elastomers include diene rubbers and their hydrogenated products (for example, NR, IR, epoxidized natural rubber, SBR, BR (high-cis BR and low-cis BR), NBR, hydrogenated NBR, hydrogenated SBR), olefin rubbers (for example, ethylene propylene rubbers (EPDM and EPM), maleic acid-modified ethylene propylene rubber (M-EPM)), isobutylene isoprene rubber (IIR), copolymers of isobutylene and aromatic vinyl or diene monomer, acrylic rubber (ACM), ionomers, halogen-containing rubbers (for example, Br-IIR, Cl-IIR, brominated isobutylene-p-methylstyrene copolymers (Br-IPMS), chloroprene rubber (CR), epichlorohydrin rubbers (CHC and CHR), chlorosulfonated polyethylene (CSM), chlorinated polyethylene (CM), maleic acid-modified chlorinated polyethylene (M-CM)), silicone rubbers (for example, methyl vinyl silicone rubber, dimethyl silicone rubber, methylphenylvinyl silicone rubber), sulfur-containing rubbers (for example, polysulfide rubber), fluororubbers (for example, vinylidene fluoride rubbers, fluorine-containing vinyl ether rubbers, tetrafluoroethylene-propylene rubbers, fluorine-containing silicone rubbers, fluorine-containing phosphazene rubbers), and thermoplastic elastomers (for example, styrene elastomers, olefin elastomers, polyester elastomers, urethane elastomers, and polyamide elastomers). A combination of two or more of these elastomers may also be used.

Moreover, if a particular thermoplastic resin is incompatible with such an elastomer component, it may be preferable that an appropriate compatibilizer be added thereto as a third component. In other words, mixing a compatibilizer into the system reduces the interfacial tension between the thermoplastic resin and the elastomer component. As a result, the particles of the elastomer component that form the disperse phase are made finer, so that both components can exhibit their characteristics more effectively. As such a compatibilizer, it is possible to use in general a copolymer having a structure of at least one of the thermoplastic resin and the elastomer component, or an agent having a copolymer structure having an epoxy group, a carbonyl group, a halogen group, an amino group, an oxazoline group, or a hydroxyl group, which is capable of reacting with any of the thermoplastic resin and the elastomer component.

The compatibilizer may be selected depending on the types of the thermoplastic resin and the elastomer component to be mixed with each other. What is normally used is styrene/ethylene-butylene block copolymers (SEBS) and their maleic acid-modified products, EPDM:EPDM/styrene or EPDM/acrylonitrile graft copolymers and their maleic acid-modified products, styrene/maleic acid copolymers, reactive phenoxine, and the like. The blending proportion of the compatibilizer is not particularly limited, but may preferably be 0.5 to 10 parts by weight per 100 parts by weight of the polymer components (the total amount of the thermoplastic resin and the elastomer component).

When the thermoplastic resin and the elastomer are blended with each other, the composition ratio of a particular thermoplastic resin (A) to an elastomer component (B) is not particularly limited, and may be set as appropriate with the balance among the thickness, the air impermeability, and the flexibility taken into consideration. The composition ratio is preferably in a range from 10/90 to 90/10, and more preferably in a range from 15/85 to 90/10, in weight ratio of (A)/(B).

EXAMPLES

Hereinafter, the specific structures and effects of the present invention will be described by showing Examples, Conventional Example, and Comparative Example.

Note that, the tires prepared and evaluated for those examples were heavy-duty tires having a tire size of 11R22.5.

The following evaluation items and measurement items were obtained by performing evaluation and measurement on the tires according to the methods described below.

(1) Inner Pressure Holding Performance:

Each of the test tires was fitted onto a regular rim and inflated to a regular inner pressure. The test tire was run in this state for a running distance of 100 km. Thereafter, the tire was again inflated to the regular pressure, and then was left in an oven at a temperature of 80° C. under a no-load condition for 2 months. The inner pressure of the tire was measured every 3 hours, and a value α was obtained by regression using the following expression:

$$Pt/Po = \exp(-\alpha t)$$

where Pt represents the measured pressure, Po represents the initial pressure, and t represents the duration of the time period (days).

By using the obtained value α and substituting 30 (days) for t, $$\beta = [1 - \exp(+\alpha t)] \times 100$$

was obtained. β was defined as the inner pressure reduction rate per month (%/month). Then, the reciprocal of the inner pressure reduction rate was expressed by an index where the inner pressure holding performance of Conventional Example was taken as 100. The larger the index is, the more excellent the tire is in inner pressure holding performance.

(2) Durability Performance:

Each of the tires was fitted onto the regular rim in the same manner as that for the evaluation of the inner pressure holding performance. Then, the tire was inflated to an inner pressure of 700 kPa, and left in an oven at a temperature of 80° C. under a no-load condition for 2 weeks. Then, the tire was again inflated to the regular pressure, and was run on a drum with a load of 3815 kg at a speed of 20 km/h. The running of the tire was terminated when a damage that was able to be visually observed occurred in the appearance of the tire. The durability performance of the tire was expressed by an index where the durability performance of Conventional Example was taken as 100. The larger the index is, the more excellent the tire is in durability performance.

(3) Toe-Chip Resistance:

Each of the tires was fitted onto the regular rim and inflated to the regular inner pressure. After the tire was left in an oven at a temperature of 80° C. under a no-load condition for 2 months, the tire was again fitted onto and removed from the regular rim repeatedly 30 times at the maximum. Then, whether or not a toe-chip had occurred in the appearance of the tire was visually observed. If no tie-chip had occurred, the tire was determined as "GOOD," while if any had occurred, the tire was determined as "BAD." Moreover, once the tire was determined as "BAD," the operation of fitting and removing the tire onto and from the rim was terminated.

Figure 6:
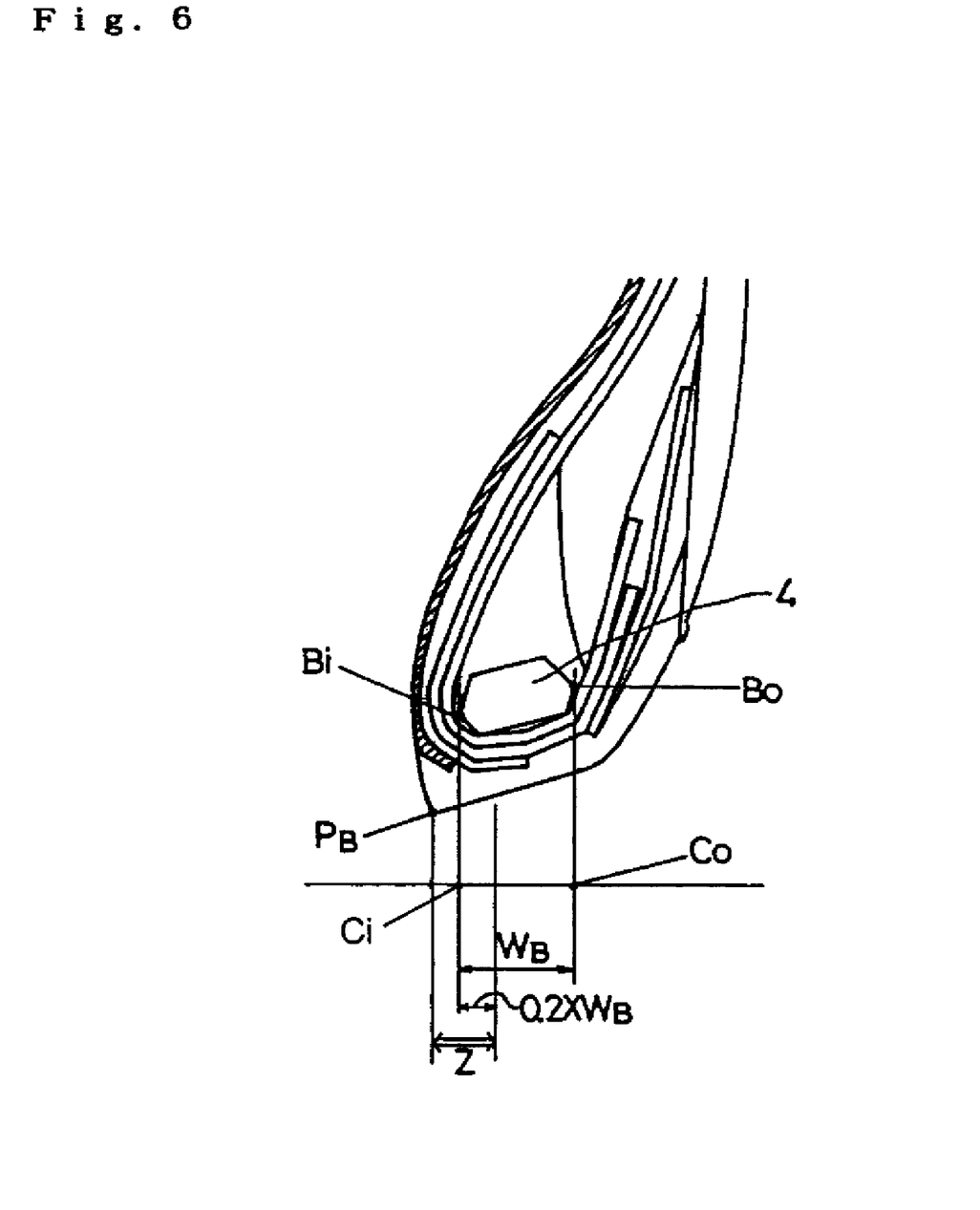
FIG. 6 is a schematic model view of a bead portion for describing a width $W_B$ of a bead core.

(4) Width $W_B$ of Bead Core:

As has already been shown in FIG. 6, the tire's innermost surface point, in the tire axial direction, of the bead core is denoted by Bi, while the tire's outermost surface point thereof is denoted by Bo. Vertical lines are drawn down in the tire radial direction from these two points Bi and Bo. Intersections at which the respective vertical lines intersect a line parallel to the tire axial direction are denoted by Ci and Co. The distance between these intersections Ci and Co is defined as the width $W_B$ of the bead core.

Examples 1 to 6

Each of the tires of Examples 1 to 3 includes a bead portion having the structure of the schematic model shown in FIG. 2, in which the member 8 of the thermoplastic elastomer composition containing the blend of the thermoplastic resin with the elastomer is disposed at a position closer to the center of the tire than the inner liner 6.

Each of the tires of Examples 4 to 6 includes a bead portion having the structure of the schematic model shown in FIG. 3, in which the inner liner 6 is disposed at a position closer to the center of the tire than the member 8 of the thermoplastic elastomer composition containing the blend of the thermoplastic resin with the elastomer.

The member 8 of the thermoplastic elastomer composition containing the blend of the thermoplastic resin with the elastomer used in Examples 1 to 6 described above has a composition described in Table 1 as follows.

TABLE 1

| | | Blending Proportion (Parts by Weight) |
|---|---|---|
| Elastomer | Br-IPMS (note 1) | 100 |
| Crosslinker | ZnO (note 2) | 1.0 |
| | Stearic Acid (note 3) | 0.5 |
| Thermoplastic Resin | Nylon 6, 66 (note 4) | 56 |

(note 1): Br-IPMS (Exxpro 89-4) manufactured by ExxonMobil Chemicals
(note 2): Zinc white (Zinc No. 3) manufactured by Seido Chemical Industry Co., Ltd.
(note 3): Stearic Acid (Beads Stearic Acid) manufactured by Nippon Oil & Fats Corporation
(note 4): Nylon 6, 66 (Ube Nylon 5033B) manufactured by Ube Industries, Ltd.

The member 8 of the thermoplastic elastomer composition was prepared in the following manner with the composition shown in Table 1. The elastomer and the crosslinker were mixed at 100° C. for two minutes by using a closed-type Banbury mixer (manufactured by Kobe Steel, Ltd.), so that an elastomer composition was prepared. The elastomer composition was then processed into pellets by using a rubber pelletizer (manufactured by Moriyama Manufacturing Co., Ltd.). Next, pellets of a thermoplastic resin and the pellets of the elastomer composition thus prepared in advance were kneaded by using a double-shaft kneader (manufactured by Japan Steel Works, Ltd), so that pellets of the thermoplastic elastomer composition were prepared. The pellets thus prepared were formed into a sheet having a predetermined thickness by using a T-die molder.

The sheets of the member 8 of the thermoplastic elastomer composition used in Examples 1 to 6 described above had thicknesses of 0.2 mm (Examples 1, 2, 4, and 6), 0.5 mm (Example 5), and 1.0 mm (Example 3).

In addition, the length L (overlapping length) by which the inner liner 6 was overlapped with the member 8 of the thermoplastic elastomer composition was 20 mm in Example 1, 10 mm in Examples 2 and 5, 5 mm in Example 3, and 25 mm in Examples 4 and 6.

The tires of Examples 1 to 6 were prepared also as follows in terms of the position of the lower end of the member 8 of the thermoplastic elastomer composition containing the blend of the thermoplastic resin with the elastomer. Specifically, in Example 1, the lower end of the member 8 was located at the position of the front end $P_B$ of the bead toe. In Examples 2 to 5, the lower end of the member 8 was located at a position, beneath the bead 4, away from an end of the bead core by a distance of 0.2 times (20%) of the width $W_B$ of the bead core. In Example 6, the lower end of the member 8 was located at a position, beneath the bead 4, away from the end of the bead core by a distance of 0.3 times (30%) of the width $W_B$ of the bead core.

Conventional Example

Figure 4:
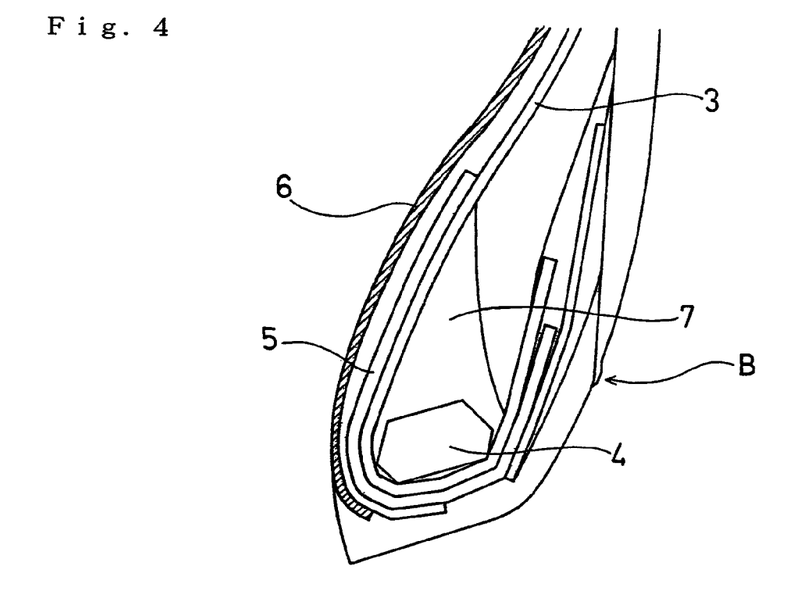
FIG. 4 is a schematic model view of a cross-section, taken in a meridian direction, of a tire bead portion, and shows the structure of the conventionally-available general heavy-duty pneumatic tire.

The tire of Conventional Example was shown in FIG. 4, and specifically had a generally-employed structure without using the thermoplastic resin nor the thermoplastic elastomer composition containing the blend of the thermoplastic resin with the elastomer.

Comparative Example 1

Figure 5:
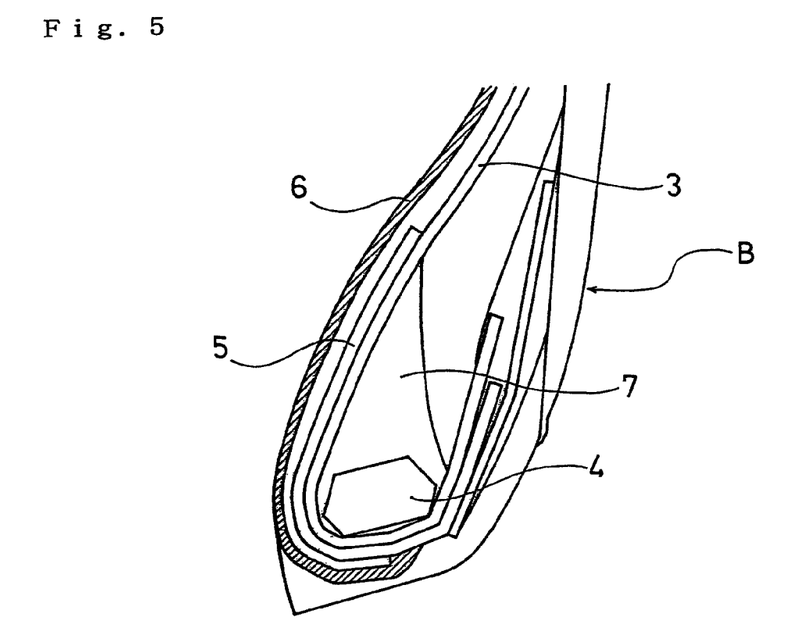
FIG. 5 is a schematic model view of a cross-section, taken in a meridian direction, of a tire bead portion, and shows a structure of a heavy-duty pneumatic tire formed according to a known example (Patent Document 1) tested as Comparative Example.

The tire of Comparative Example 1 was shown in FIG. 5, and had a structure in which the lower end of the inner liner 6 was extended to a position beneath the bead portion so as to wrap around the front end $P_B$ of the bead toe.

In each of Examples, Comparative Example, and Conventional Example, a butyl rubber (thickness: 2.5 mm) was used for the inner liner, and the steel cord reinforcing layer 5 was disposed on the outer side of the carcass 3.

Results of evaluating Examples, Comparative Example, and Conventional Example are shown in Table 2.

The heavy-duty pneumatic tires according to the present invention exhibited excellent performances in any of the evaluation items: the inner pressure holding performance, the durability performance, and the toe-chip resistance.

TABLE 2

| | Conventional Example | Example 1 | Example 2 | Example 3 | Example 4 | Example 5 | Example 6 | Comparative Example 1 |
|---|---|---|---|---|---|---|---|---|
| Bead Structure | FIG. 4 | FIG. 2 | FIG. 2 | FIG. 2 | FIG. 3 | FIG. 3 | FIG. 3 | FIG. 5 |
| Thickness (mm) | — | 0.2 | 0.2 | 1.0 | 0.2 | 0.5 | 0.2 | — |
| Overlapping Length (mm) | — | 20 | 10 | 5 | 25 | 10 | 25 | — |
| Position of Lower End | — | Bead Toe | Beneath Bead (20% × $W_B$) | Beneath Bead (20% × $W_B$) | Beneath Bead (30% × $W_B$) | Beneath Bead (20% × $W_B$) | Beneath Bead (30% × $W_B$) | — |
| Set | — | Innermost Side | Innermost Side | Innermost Side | Sandwiched | Sandwiched | Sandwiched | — |

TABLE 2-continued

|  | Conventional Example | Example 1 | Example 2 | Example 3 | Example 4 | Example 5 | Example 6 | Comparative Example 1 |
|---|---|---|---|---|---|---|---|---|
| Inner Pressure Holding Performance | 100 | 140 | 150 | 187 | 150 | 182 | 152 | 150 |
| Durability Performance | 100 | 185 | 188 | 192 | 190 | 197 | 105 | 180 |
| Toe-chip Resistance | Good | Good | Good | Good | Good | Good | Good | Bad |

What is claimed is:

1. A heavy-duty pneumatic tire comprising:

a carcass; and an inner liner disposed closer to the center of the tire than the carcass, wherein the inner liner does not extend to a region radially inward of a bead core, wherein a member formed of one of a thermoplastic resin and a thermoplastic elastomer composition comprising a blend of a thermoplastic resin with an elastomer is disposed at a position closer to the center than the carcass in a bead portion in such a manner as to wrap at least a region extending from the front end $P_B$ of the bead toe to a portion beneath the bead core, wherein the member overlaps the inner liner by at least 2 mm, wherein a lower end side edge of the member is located within a region beneath the bead core, which extends from the front end $P_B$ of the bead toe to a position away from an end, on the bead toe side, of the bead core by a distance of not more than 20% of a width $W_B$ of the bead core, and further wherein the member is of a substantially uniform thickness.

2. The heavy-duty pneumatic tire according to claim 1, wherein an upper end side edge of the member is located at a position closer to the center of the tire than a lower end side edge of the inner liner.

3. The heavy-duty pneumatic tire according to claim 1, wherein an upper end side edge of the member is located at a position farther from the center of the tire than a lower end side edge of the inner liner.

4. The heavy-duty pneumatic tire according to claim 2, wherein an adhesion reinforcing rubber layer is disposed between layers respectively of the carcass and the member.

5. The heavy-duty pneumatic tire according to claim 1, wherein member has an air permeability coefficient of $1 \times 10^{-12}$ to $40 \times 10^{-12}$ cc·cm/cm²·sec·cmHg, and a thickness of 0.2 mm to 2.0 mm.

6. A heavy-duty pneumatic tire comprising:

a carcass; and an inner liner disposed closer to the center of the tire than the carcass, wherein the inner liner does not extend to a region radially inward of a bead core, wherein a member formed of one of a thermoplastic resin and a thermoplastic elastomer composition comprising a blend of a thermoplastic resin with an elastomer is disposed at a position closer to the center than the carcass in a bead portion in such a manner as to wrap at least a region extending from the front end $P_B$ of the bead toe to a portion beneath a bead core, wherein the member overlaps the inner liner by at least 2 mm, wherein a lower end side edge of the member is located beneath the bead core but does not extend past a point at a distance greater than 20% of a width $W_B$ of the bead core, and wherein an upper end side edge of the member is located at a position closer to the center of the tire than a lower end side edge of the inner liner.

7. The heavy-duty pneumatic tire according to claim 6, wherein an adhesion reinforcing rubber layer is disposed between layers respectively of the carcass and the member.

8. The heavy-duty pneumatic tire according to claim 6, wherein the member has an air permeability coefficient of $1 \times 10^{-12}$ to $40 \times 10^{-12}$ cc·cm/cm²·sec·cmHg, and a thickness of 0.2 mm to 2.0 mm.

\* \* \* \* \*